March 29, 1938. W. B. UNDERWOOD 2,112,639
STERILIZING APPARATUS
Filed May 24, 1933 2 Sheets-Sheet 1
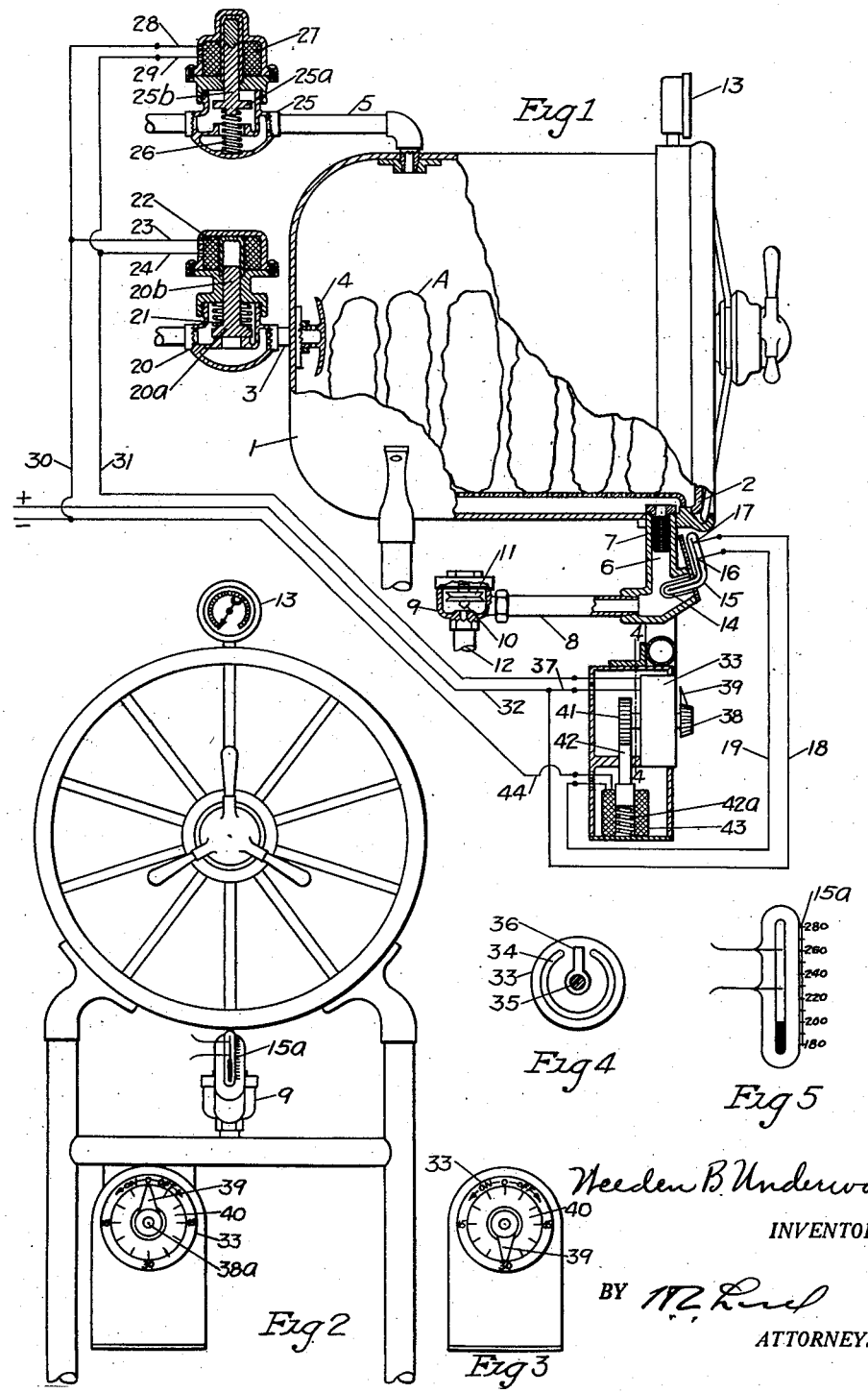

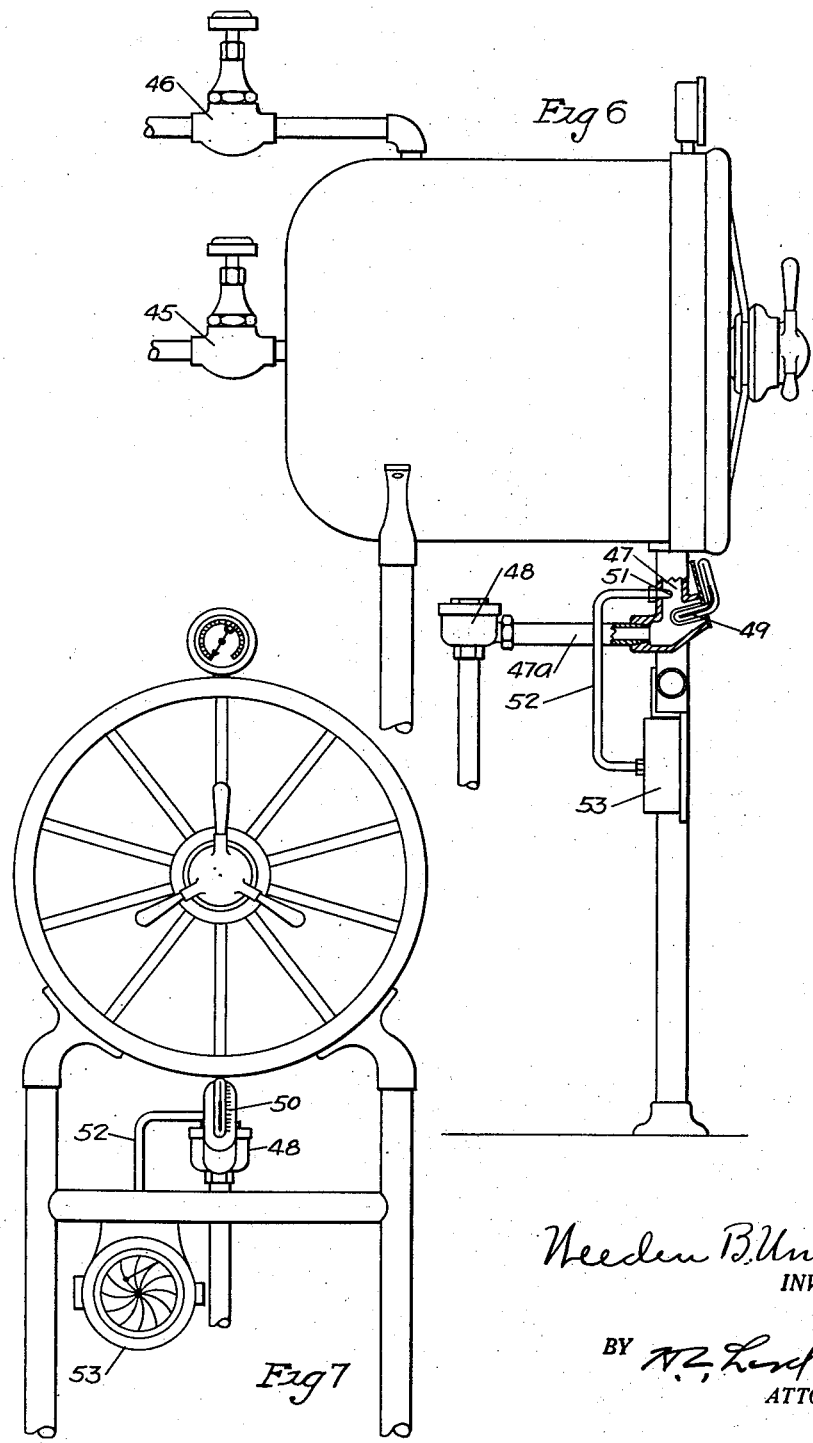

Patented Mar. 29, 1938

2,112,639

UNITED STATES PATENT OFFICE 2,112,639

STERILIZING APPARATUS

Weeden B. Underwood, Erie, Pa., assignor to American Sterilizer Company, Erie, Pa., a corporation of Pennsylvania Application May 24, 1933, Serial No. 672,671

11 Claims. (Cl. 21—98)

Sterilizers involve peculiar problems, particularly with relation to the intensity and duration of the heat applied for the sterilizing operation. Any lack of certainty as to either of these factors may result in very serious consequences.

The problem is rendered more difficult by reason of the fact that the sterilizing chamber is charged and discharged of the material being sterilized at comparatively frequent intervals and with each charging operation the sterilizer is filled with air occupying the free space of the sterilizer and it also permeates the material. This air very definitely interferes with the application of sterilizing temperature to the material to be sterilized and also increases the difficulty as to certainty of sterilizing control. By reason of this some sterilizers are provided with means for evacuating a part of the air from the sterilizer chamber prior to the introduction of steam, in this way reducing this difficulty, but even with the best methods employed there has been uncertainty in the control of the effective sterilizing temperature.

In order that this may be understood it has been common to introduce steam at a definite pressure and pressure gauges have been used as indicative of the effective sterilizing temperature which is applied to the material in the sterilizer. It is well known that saturated steam at a given pressure will have a very definitely corresponding temperature. Thus the ordinary sterilizing temperature of 250° F. is accompanied by a fifteen pound pressure in the sterilizer chamber, providing the air has been worked out of the chamber, but if any considerable percentage of air is retained in the chamber, as must be with the initial filling of steam, the pressure gives a very inaccurate indication of what the actual temperature is and this condition will persist a length of time to make sterilizing very uncertain even though the sterilizing period is quite extended.

Fortunately the air is somewhat heavier than steam and consequently can be drawn off from the sterilizer chamber in connection with the condensate from the steam. The discharge of such condensate and air is definitely accomplished through a discharge passage, or pipe, controlled by a thermostatically responsive valve, the valve remaining open so long as the comparatively cool air and condensate are passing, but closing with any considerable discharge of steam at the steam temperature. In order that such a valve may operate satisfactorily it is common to provide a comparatively extended cooling leg in which the condensate may cool sufficiently to more certainly operate the thermally responsive valve. The disturbing action of the air is somewhat aggravated by the air which is contained in the material to be sterilized. This air even though subjected to the steam pressure excludes steam to that part of the material in which the air is trapped and this air is worked out of the material through the gravity difference between the steam and the air gradually and this air as it is freed must find its way to the discharge and be disposed of before the accurate application of sterilizing temperature can be applied to the material. The ultimate discharge of the air and condensate and the continued control of the condensate is well accomplished by the common thermally responsive valve, but this does not give the assurance with certainty as to sterilizing temperatures in the chamber that safety demands and consequently instances have been found in carefully managed hospitals where the discharge line has become so clogged, or obstructed that even with proper gauge showings and time intervals for sterilizing defective sterilizing has taken place. The purpose of the present invention is to eliminate this uncertainty and to definitely assure a sterilizing temperature in the sterilizing chamber corresponding with the means utilized for indicating the presence of such temperature. Preferably this is accomplished in the present invention, both as to temperature and sterilizing period automatically, but in the broader phases of the invention this may be accomplished by operator control. Features and details of the invention will appear from the specification and claims.

Preferred embodiments of the invention are illustrated in the accompanying drawings as follows:—

Fig. 1 shows a side elevation, partly in section, of a sterilizer having the features of the invention.

Fig. 2 an end view of the same.

Fig. 3 a view showing a time responsive device at set position.

Fig. 4 a section on the line 4—4 in Fig. 1.

Fig. 5 an enlarged view of the temperature indicating device.

Fig. 6 a side elevation of a sterilizer having a modified indicator.

Fig. 7 an end view of the same.

I marks the sterilizing chamber. This is provided with the usual steam-tight charging door 2. It has a steam inlet 3 with the usual deflector 4 and exhaust passage 5. A discharge passage 6 leads from the bottom of the sterilizer chamber. It is provided with a screen 7 which may be readily taken care of through the door opening into the chamber. A cooling leg 8 extends from the discharge passage 6 and a thermally actuated valve 9 is arranged at the end of the leg. This has a valve element 10 which is controlled by a thermal element 11. The condensate is discharged through a pipe 12.

In the ordinary operation of the sterilizer, the load, or material A to be sterilized is inserted into the chamber through the charging door. Steam is admitted through the steam inlet. This steam pressure is usually controlled through some outside source, either by a pressure controlling valve at the sterilizer, or a pressure control for a sterilizing system. The steam entering the chamber gradually builds up some pressure and the air through gravity finds its way to the bottom of the chamber and is discharged with the condensate from the steam through the discharge passage and the valve 9. Some little period is required to displace the free air in the chamber and still further time required to work the air out of the material being sterilized. As soon as the air and the condensate have sufficiently discharged to bring about a comparatively free discharge of steam the thermally actuated valve 9 closes, or partially closes, so as to build up the pressure in the chamber to the pressure of the steam in the line. The chamber is provided with a pressure gauge 13 and the common practice has been to time the sterilizing action with relation to the time when the pressure reaches a predetermined sterilizing pressure.

In the present device, no attention is intended to be given so far as sterilizing conditions and interval are concerned to the pressure indicated by the pressure gauge. In lieu thereof a thermal element, or thermometer 14 is introduced into the vertical discharge passage 6 directly in the path of the fluid, air, water and steam, discharged from the chamber. This fluid, water, or steam, indicates with very close accuracy the actual temperature in the chamber and under all circumstances a temperature slightly below the actual temperature in the chamber. The time interval for the sterilizing is determined from the time the thermometer indicates a pre-determined sterilizing temperature which may be read on the scale 15a exposed in a convenient position to be read at the front of the sterilizer.

If there is any failure in the free discharge and control by the thermally actuated valve 9 a sterilizing temperature will not be attained in the sterilizing chamber and a sterilizing temperature will not be indicated on the temperature indicator 15 and consequently the operator will not time a sterilizing operation under these conditions even though the pressure may indicate the full sterilizing pressure. The present invention, therefore, introduces into the system a certainty as to sterilizing conditions which has not heretofore obtained in ordinary practice in these sterilizers. If the sterilizer does not come to the prescribed temperature the operator is apprized of the fact that something is wrong, either a failure of steam at the steam inlet, or a failure of discharge at the discharge outlet. In either case, there can be no failure of sterilization except through the inattention, or carelessness of the operator.

While I have shown the thermally actuated valve 9, it will be understood that this valve may be manually controlled, if desired, through observation of the attendant, but this, of course, involves added attention and more or less constant attention.

I prefer to provide an automatic system whereby the timing of the sterilizing operation is automatically controlled beginning with the attainment of the proper sterilizing temperature in the chamber and is terminated at the end of the period pre-determined as the sterilizing period. To accomplish this, I provide the electric terminals 16 and 17 in the mercury tube used in the temperature indicating device 15, the circuit being closed between these terminals when bridged by the mercury at the pre-determined temperature. The terminals are connected with wires 18 and 19.

An electrically actuated steam valve 20 is provided for the steam inlet. A valve head 20a is normally closed by a spring 21 which is supplemented by the pressure in maintaining closure. A solenoid 22 operates on a stem 20b of the valve and wires 23 and 24 lead to and from the solenoid. An exhaust valve 25 is provided with a movable head 25a which is normally opened by a spring 26. The stem 25b partly of magnetic metal of the valve operates as the movable element in a solenoid 27 which has wires 28 and 29 leading to and from the solenoid. The wires 23, 24 and 28, 29 connect with wires 30 and 31, the wire 30 being one of the supply wires leading to the apparatus. A time switch 33 is provided. This has a brush plate 34 which forms nearly a complete annulus. A terminal 35 has a rotating brush finger 36 operating on the brush plate 34. The wire 31 leads to the brush plate and a wire 37 leading from the line wire 32 leads to the terminal 35. An operating button 38 mounted on a clock shaft 38a actuates the brush finger 36 to swing it a greater, or less, distance around the brush plate 34. An indicator pointer, or hand 39 is carried by the button 38 and moves over a dial 40 on the clock face. Thus in Fig. 3 the pointer is indicated at 30 indicating that it requires a period of thirty minutes for the clock to move the brush finger 36 off the brush plate 34 at the off position of the time clock. The shaft 38a is provided with a ratchet wheel 41 which is engaged by a pawl 42 which is yieldingly held in engagement by a spring 42a. This pawl is carried by the active element of a solenoid 43.

The wire 19 leads to one side of this solenoid and a wire 44 from the other side of the solenoid to the line wire 30. In the operation of this automatic control, the operator charges the chamber, turns the clock pointer over the dial to a position indicating the time interval desired. This immediately closes the circuit by way of the wire 32, 37, terminal 35, finger 36, brush plate 34, wire 31, wire 24, solenoid 22, wire 23 and to the line wire 30. At the same time a shunt circuit is established from the wire 31 by way of wire 29, solenoid 27, wire 28 to the wire 30, the result of this being that the steam valve is opened through the action of its solenoid and the exhaust valve is closed through the action of its solenoid. With this introduction of steam, air is gradually forced out of the sterilizing chamber and it, with the consequent condensate, is discharged through the discharge passage 6. When this discharge is continued for a sufficient length of time to involve a definite discharge of steam the thermally actuated valve 9 closes and when the temperature of the chamber has reached the desired sterilizing temperature the mercury of the temperature indicator 15 will have bridged the terminals 16 and 17, thus closing the circuit by way of the wire 18, terminal 17, mercury, terminal 16, wire 19, solenoid 43 and wire 44. This immediately withdraws the pawl 42 permitting the clock to start its return operation. The clock then operates for the period set by the operator and when the finger 36 reaches the off-position current is cut off from the solenoids 22 and 27, the steam valve closes, and the exhaust valve opens. The material then may be removed from the sterilizer at any convenient time after the completion of the operation. In this automatic control, it will be noted that there will be no action of the time clock unless a sterilizing temperature is attained, or if that temperature is not maintained during the interval the current will be cut from the solenoid 43 and the pawl 42 immediately re-engaged so that there will be an indication to the operator that the sterilizing operation has not been completed and it will only be completed and indicated as complete when there has been a full sterilizing period at the pre-determined sterilizing temperature.

In the modified structures shown in Figs. 6 and 7, the automatic timing control is omitted and the steam and exhaust valves 45 and 46 are manually operated. A discharge passage 47 leads by a cooling leg 47a to the thermally actuated valve 48 corresponding in structure to the valve 9. A temperature indicator in the form of a thermometer 49 is arranged in the vertical passage 47 and this thermometer has an exposed portion with a scale 50 which may be readily read by the operator observing the time at which the temperature is attained and terminating the operation at the end of the interval. Here, as in the other structure, if there is any failure, either in the supply of steam, or discharge, the temperature indicator will fail to respond and consequently apprize the operator of a failure of a sterilizing operation. Preferably also a thermally controlled register may be used, a thermal tube 52 extending into the vertical passage at 51 and leading to a register 53. In this way not only is the temperature indicated, but the temperature is recorded and from this record the sterilizing operations of the sterilizer are recorded and the temperature and interval of each sterilizer operation is also recorded, the recording device being the ordinary time-driven register responsive to thermal conditions of the thermally responsive tube 52.

What I claim as new is:—

1. In a sterilizing apparatus, the combination of a sterilizing chamber; a steam inlet device; a water and air discharge device leading from the sterilizer; a timing device controlling the closing of the steam inlet device; and a thermally responsive means controlling the starting of the timing device, said means being responsive to sterilizer temperature in the sterilizer.

2. In a sterilizing apparatus, the combination of a sterilizing chamber; a steam inlet device; a water and air discharge device; a timing device controlling the closing of the steam inlet device; a thermally responsive means controlling the starting of the timing device, said means being responsive to sterilizer temperature; and means controlling the discharge device.

3. In a sterilizing apparatus, the combination of a sterilizing chamber; a steam inlet device; a water and air discharge device; a timing device controlling the closing of the steam inlet device; a thermally responsive means controlling the starting of the timing device, said means being responsive to sterilizer temperature; and a thermally responsive device controlling the discharge device.

4. In a sterilizing apparatus, the combination of a sterilizing chamber; a steam inlet device; a steam exhaust device; an air and water discharge device; a timing device controlling the closing of the steam inlet and the opening of the exhaust; and a thermally responsive means controlling the starting of the timing device, said means being responsive to sterilizer temperature.

5. In a sterilizing apparatus, the combination of a sterilizing chamber; a steam inlet device; an air and water discharge device; an electric device controlling the steam inlet; and thermally and time responsive switches in series controlling the electric device to control the time responsive switch for a pre-determined period of time at a pre-determined minimum temperature, said thermally responsive switch being responsive to sterilizer temperature.

6. In a sterilizing apparatus, the combination of a sterilizing chamber; a steam inlet device; a steam exhaust device; a water and air discharge device; electric devices controlling the steam inlet and steam exhaust devices; and thermally and time responsive switches in series controlling said electric devices to control the time responsive switch for a pre-determined period of time at a pre-determined minimum temperature, said thermally responsive switch being responsive to sterilizer temperature.

7. In a sterilizing apparatus, the combination of a sterilizing chamber; a steam inlet device; a water and air discharge device; a clock adjustable for operation with different time intervals between starting and stopping; means controlled by the clock controlling the steam inlet device; and devices responsive to sterilizer chamber temperature controlling the time of starting of the clock when set for operation.

8. In a sterilizing apparatus, the combination of a sterilizing chamber; a steam inlet device; a water and air discharge device; a timing device controlling the steam inlet; a thermally responsive device comprising an electrically conductive liquid thermal element; terminals closed by said element; and electric devices in circuit with said terminals controlling the timing device.

9. In a sterilizing apparatus, the combination of a sterilizing chamber; a steam inlet device; a water and air discharge device; a timing device controlling the steam inlet comprising an electric means actuating the steam inlet device, said means being controlled by the timing device; a thermally responsive device comprising an electrically conductive liquid thermal element; terminals closed by said element; and electric devices in circuit with said terminals controlling the timing device, the electric devices being in controlled series from the same source of electric energy.

10. In a sterilizer, the combination with a sterilizing chamber, a steam inlet device, a water and air discharge device, a thermally responsive means controlling the discharge device, a time responsive device, a thermally responsive device responsive to discharge fluid temperature, and a time responsive device responsive to the action of the thermally responsive device, the said thermally responsive device controlling the action of the time responsive device for a pre-determined period of time at a pre-determined minimum sterilizing temperature in the discharge fluid.

11. In a sterilizing apparatus, the combination of a sterilizing chamber, a time responsive device, a thermally responsive means responsive to the sterilizer temperature controlling the action of the time responsive device for a predetermined period of time at a predetermined minimum sterilizer temperature means supplying steam to the sterilizing chamber, and steam controlling means responsive to the action of the time device.

WEEDEN B. UNDERWOOD.